United States Patent [19]
VanDeMoere

[11] Patent Number: 5,229,801
[45] Date of Patent: Jul. 20, 1993

[54] PORTRAIT CAMERA WITH HORIZONTAL/VERTICAL MODE VIEWFINDER

[75] Inventor: Alan V. VanDeMoere, Rochester, N.Y.

[73] Assignee: Eastman Kodak Company, Rochester, N.Y.

[21] Appl. No.: 822,819

[22] Filed: Jan. 21, 1992

[51] Int. Cl.$^5$ .............................................. G03B 13/10
[52] U.S. Cl. .................................................... 354/222
[58] Field of Search ................................. 354/219-225

[56] References Cited

U.S. PATENT DOCUMENTS

| | | | |
|---|---|---|---|
| 1,137,864 | 5/1915 | King | 354/223 |
| 1,616,723 | 8/1921 | Wandersleb | 354/222 |
| 2,187,246 | 10/1938 | Nerwin | 354/219 |
| 3,727,530 | 4/1973 | Aoki | 354/195.13 |
| 4,011,571 | 3/1977 | Okuzawa | 354/219 |

FOREIGN PATENT DOCUMENTS

| | | |
|---|---|---|
| 31150 | 5/1967 | Fed. Rep. of Germany . |
| 1259871 | 6/1960 | France . |
| 875978 | 6/1960 | United Kingdom . |

Primary Examiner—Michael L. Gellner
Assistant Examiner—Howard B. Blankenship
Attorney, Agent, or Firm—Roger A. Fields

[57] ABSTRACT

A portrait camera is intended to be used for picture-taking in a horizontal orientation and in a vertical orientation. When the camera is oriented horizontally, two head-finder circles or the like are visible in the field of view of the viewfinder to frame the respective heads of two people. When the camera is oriented vertically, only one of the head-finder circles is visible in the field of view of the viewfinder to frame the head of one person. Thus, two people are to be photographed when the camera is oriented horizontally, but only one person is to be photographed when the camera is oriented vertically.

6 Claims, 2 Drawing Sheets

PORTRAIT CAMERA WITH HORIZONTAL/VERTICAL MODE VIEWFINDER

BACKGROUND OF THE INVENTION

1. Field of the Invention

The invention relates generally to the field of photography cameras, and specifically to camera viewfinders.

2. Description of the Prior Art

When taking a picture it is necessary to know not only in what direction to aim the camera but also how much of the subject(s) will be included in the picture. For this reason practically every camera has a viewfinder of some kind.

Viewfinders built on to or into portrait-like cameras are usually intended to be used with the camera in a horizontal orientation for picture-taking. No distinction is made in the viewfinder for positioning the camera in a vertical orientation for picture-taking.

SUMMARY OF THE INVENTION

According to the invention, there is provided an improved camera wherein a viewfinder has a field of view for viewing a subject to be photographed when said camera is in one orientation or is in another orientation, and wherein the improvement comprises:

first and second frame means for framing at least respective parts of individual subjects to be photographed;

means for making the first frame means visible in the field of view of the viewfinder regardless of whether said camera is in one orientation or another orientation; and means for alternatively making the second frame means visible in the field of view of the viewfinder when the camera is in one orientation and not visible in the field of view when the camera is in another orientation, whereby two subjects are to be photographed when the camera is in one orientation and only one subject is to be photographed when the camera is in another orientation.

More specifically, a portrait camera is intended to be used for picture-taking in a horizontal orientation and in a vertical orientation. When the camera is oriented horizontally, two head-finder circles or the like are visible in the field of view of the viewfinder to frame the respective heads of two people. When the camera is oriented vertically, only one of the head-finder circles is visible in the field of view of the viewfinder to frame the head of one person. Thus, two people are to be photographed when the camera is oriented horizontally, but only one person is to be photographed when the camera is oriented vertically.

DETAILED DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
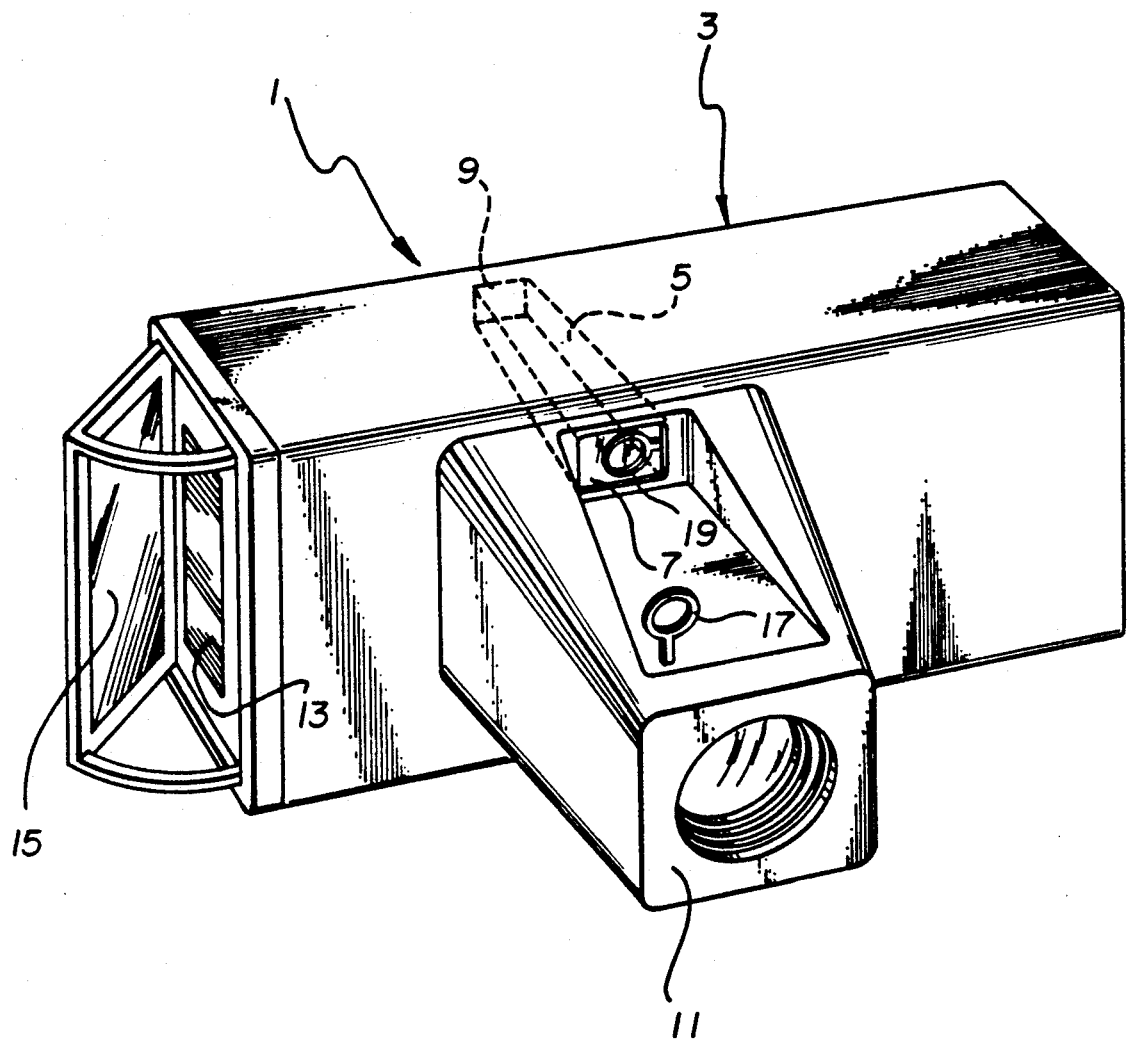
FIG. 1 is a front perspective view of a portrait camera according to a preferred embodiment of the invention.

Referring now to the drawings, FIG. 1 depicts a portrait-type camera 1 wherein a camera body 3 includes a direct see-through viewfinder tunnel 5 having front and rear rectangular openings 7 and 9, and a forwardly protruding taking-lens snout 11. An electronic flash unit 13 is located inwardly at one end of the camera body 3 beneath a pivotally supported flash reflector/flash cover 15.

Figure 2:
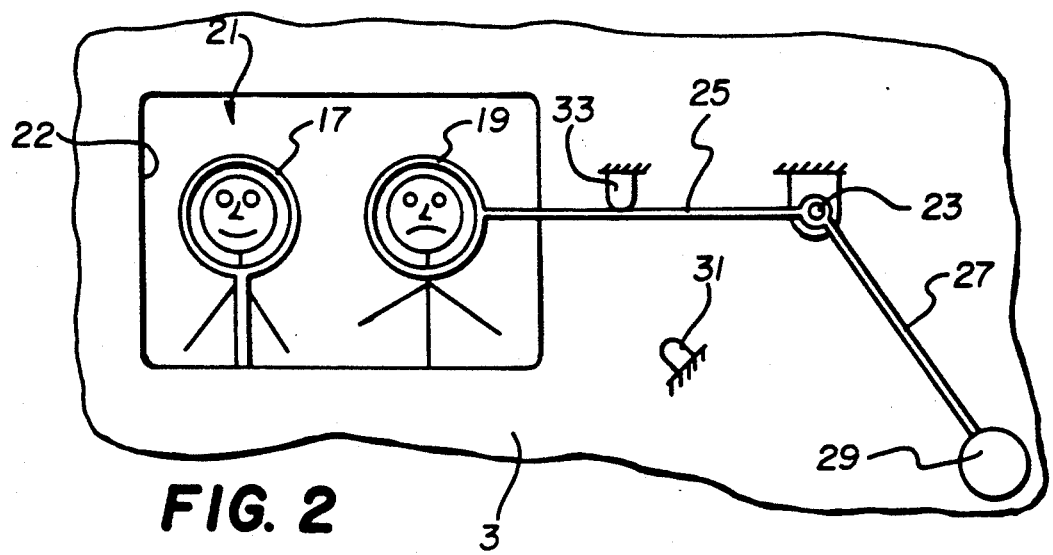
FIG. 2 is a front elevation view of a viewfinder in the portrait camera, showing the field of view of the viewfinder when the camera is in a horizontal orientation.
Figure 3:
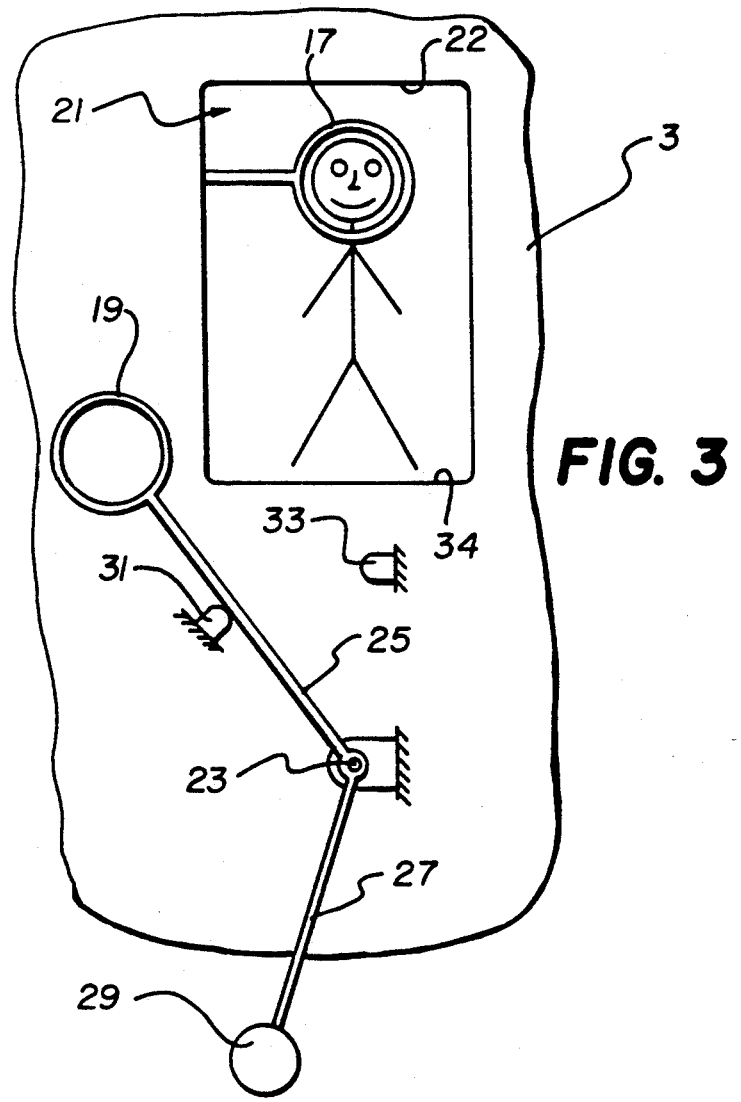
FIG. 3 is a front elevation view similar to FIG. 2, showing the field of view of the viewfinder when the camera is in a vertical orientation.

According to the invention, the portrait camera 1 is intended to be used for picture-taking in a horizontal orientation and in a vertical orientation. When the camera body 3 is oriented horizontally, two head-finder circles 17 and 19 (or the like) are visible in the field of view 21 of the viewfinder tunnel 5 to frame the respective heads of two people. See FIG. 2. When the camera body 3 is oriented vertically, only one of the head-finder circles 17 is visible in the field of view 21 of the viewfinder tunnel 5 to frame the head of one person. See FIG. 3. Thus, two people are to be photographed when the camera body 3 is oriented horizontally, but only one person is to be photographed when the camera body is oriented vertically.

The head-finder circle 17, as shown in FIG. 1, is fixedly supported on the taking lens snout 11. If one looks through the viewfinder tunnel 5 at the rear opening 9, the head-finder circle 17 appears to be off-center in the field of view 21 towards one side 22 of the field of view. See FIGS. 2 and 3.

The head-finder circle 19 is supported for swinging movement about a pivot pin 23 into and out of the viewfinder tunnel 5 through a slit (not shown) in the bottom of the viewfinder tunnel. Specifically, the pivot pin 23 is connected via one arm 25 to the head-finder circle 19 and via a second arm 27 to a weight 29. When the camera body 3 is vertically oriented, the head-finder circle 19 is removed from the viewfinder tunnel 5, with the arm 25 held against a stop 31 by the force of the weight 29. See FIG. 3. In this instance, if one looks through the viewfinder tunnel 5 at the rear opening 9, the head-finder circle 19 will not be seen. When the camera body 3 is horizontally oriented, the head-finder circle 19 is inside the viewfinder tunnel 5, with the arm 25 held against a stop 33 by the force of the weight 29. See FIG. 2. In this instance, if one looks through the viewfinder tunnel 5 at the rear opening 9, the head-finder circle 19 appears to be off-center in the field of view 21 towards another side 34 of the field of view.

The invention has been described with reference to a preferred embodiment. However, it will be appreciated that variations and modifications can be effected within the ordinary skill in the art without departing from the scope of the invention. For example, instead of mechanical means for positioning the head-finder circle 19 in the field of view 21 when the camera body 3 is oriented horizontally, electronic means such as light-emitting diodes can be employed for making the head-finder circle visible and invisible in the field of view.

I claim:

1. An improved camera wherein a viewfinder has a field of view for viewing a subject to be photographed when said camera is in one orientation or is in another orientation, and wherein the improvement comprises:

first and second frame means for framing at least respective parts of individual subjects to be photographed;

means for making said first frame means visible in the field of view of said viewfinder regardless of whether said camera is in one orientation or another orientation; and means for alternatively making said second frame means visible in the field of view of said viewfinder responsive to said camera being in one orientation and not visible in the field of view responsive to the camera being in another orientation, whereby two subjects are to be photographed when said camera is in one orientation and only one subject is to be photographed when the camera is in another orientation.

2. An improved portrait camera wherein a viewfinder has a field of view for viewing people to be photographed when said camera is oriented horizontally for horizontal format picture-taking or is oriented vertically for vertical format picture-taking, and wherein the improvement comprises:

first and second frame means for framing the respective heads of people to be photographed;

means for fixedly positioning said first frame means in the field of view of said viewfinder regardless of whether said camera is oriented horizontally or vertically; and means for alternatively positioning said second frame means in the field of view of said viewfinder responsive to said camera being oriented horizontally and out of the field of view responsive to the camera being oriented vertically, whereby two people are to be photographed when said camera is oriented horizontally and only one person is to be photographed when the camera is oriented vertically.

3. The improvement as recited in claim 2, wherein said means for positioning said first frame means includes integral means that continuously locates the first frame means off-center in the field of view of said viewfinder towards one side of the field of view, and said means for positioning said second frame means includes integral means that only locates the second frame means off-center in the field of view towards another side of the field of view when said camera is oriented horizontally.

4. The improvement as recited in claim 2, wherein said viewfinder includes a see-through tunnel that defines the field of view of the viewfinder, said means for positioning said first frame means includes integral means that continuously locates the first frame means in front of said tunnel for viewing through the tunnel, and said means for positioning said second frame means includes integral means that only locates the second frame means inside said tunnel for viewing through the tunnel when said camera is oriented horizontally.

5. The improvement as recited in claim 2, wherein said means for positioning said second frame means includes gravity actuated means for moving the second frame means out of the field of view of said viewfinder responsive to movement of said camera from a horizontal orientation to a vertical orientation.

6. An improved portrait camera wherein a viewfinder has a field of view for viewing people to be photographed when said camera is oriented horizontally for horizontal format picture-taking or is oriented vertically for vertical format picture-taking, and wherein the improvement comprises:

first and second frame means for framing the respective heads of people to be photographed;

means for making said first frame means visible off-center in the field of view regardless of whether said camera is oriented horizontally or vertically; and means for alternatively making said second frame means visible off-center int he field of view of said viewfinder towards another side of the field of view responsive to said camera being oriented horizontally and not visible in the field of view responsive to the camera being oriented vertically, whereby two people are to be photographed when said camera is oriented horizontally and only one person is to be photographed when the camera is oriented vertically.

* * * * *

UNITED STATES PATENT AND TRADEMARK OFFICE
CERTIFICATE OF CORRECTION

PATENT NO. : 5,229,801
DATED : July 20, 1993
INVENTOR(S) : Alan V. VanDeMoere

It is certified that error appears in the above-indentified patent and that said Letters Patent is hereby corrected as shown below:

Column 4, line 37  Replace "int he" with --in the--.

Signed and Sealed this

Twelfth Day of April, 1994

Attest:

BRUCE LEHMAN

Attesting Officer

Commissioner of Patents and Trademarks